No. 650,508. Patented May 29, 1900.
W. H. H. HEYDRICK.
LAWN MOWER.
(Application filed Nov. 20, 1899.)
(No Model.) 2 Sheets—Sheet 1.
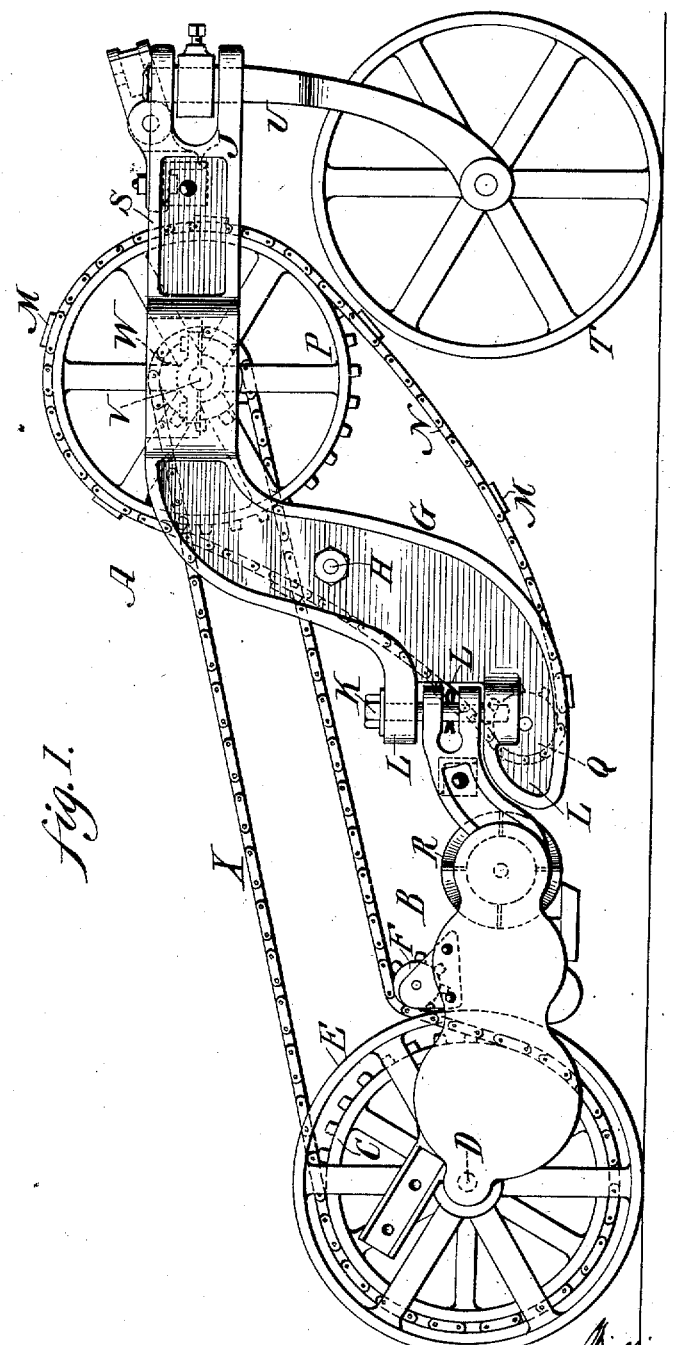

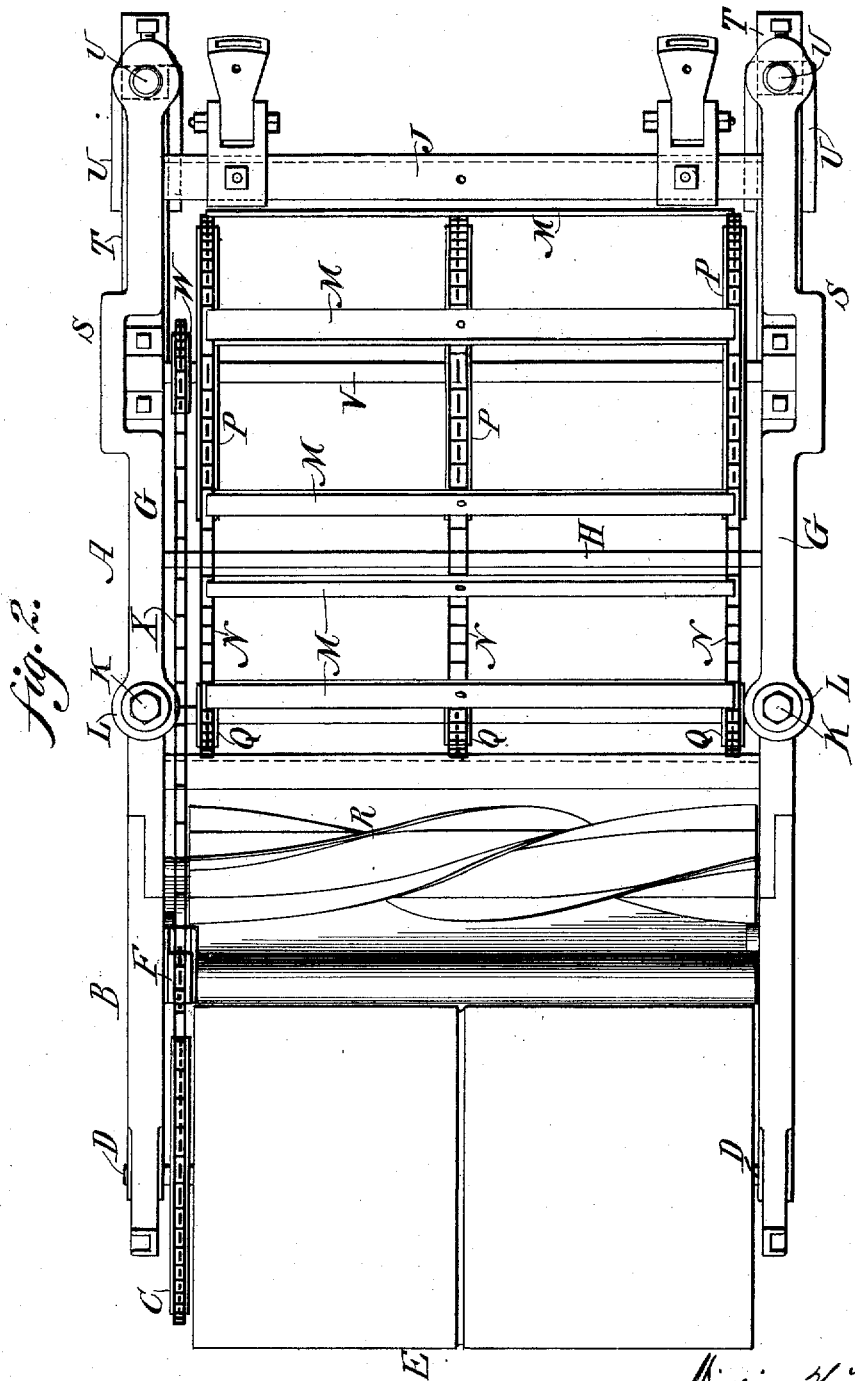

UNITED STATES PATENT OFFICE.

WILLIAM H. H. HEYDRICK, OF PHILADELPHIA, PENNSYLVANIA.

LAWN-MOWER.

SPECIFICATION forming part of Letters Patent No. 650,508, dated May 29, 1900.

Application filed November 20, 1899. Serial No. 737,585. (No model.)

*To all whom it may concern:*

Be it known that I, WILLIAM H. H. HEYDRICK, a citizen of the United States, residing in the city and county of Philadelphia, in the State of Pennsylvania, have invented a new and useful Improvement in Lawn-Mowers, which improvement is fully set forth in the following specification and accompanying drawings.

This invention consists of improvements in lawn-mowers, the object being to provide devices whereby the lawn-mower cuts long or short grass with equal facility.

This invention further consists in the features of construction hereinafter fully described, and pointed out in the claims.

Figure 1 represents a view in side elevation of a lawn-mower constructed in accordance with my invention. Fig. 2 represents a top plan view of the same.

Similar letters of reference indicate corresponding parts in the figures.

Referring to the drawings, A designates my improvement in lawn-mowers, the same consisting of an attachment upon the front end thereof that conducts the grass to the cutters in such a manner that they can readily sever the same. The lawn-mower proper is designated by B and is of familiar construction, with the exception that a gear-wheel, conveniently a sprocket-wheel C, is secured to the shaft D of the roller E thereof, and a guide-pulley F is mounted upon the side frame adjacent said gear-wheel. The said attachment A comprises a frame consisting of side pieces G, connected by a stay-rod H and cross-bar J, the draft appliances being connected with the latter. The rear ends of said side pieces G are removably connected with the forward ends of the frame-pieces of the lawn-mower, conveniently by pins K, passing through openings in a bifurcated portion L at the rear ends of the side pieces and through openings in the front ends of said side frames. This construction permits the attachment to be readily applied to existing lawn-mowers without altering their structure and as readily removed. When removed, the usual small supporting-wheels can be applied to the front ends of the side frames thereof.

With existing lawn-mowers, so far as I am informed, grass that is higher than the shaft of the cutting-cylinder cannot be successfully cut, the same being bent forwardly and not passing between the knives of said cylinder and the stationary knives. To overcome this objection, I provide traveling deflectors that bend the grass backwardly as the machine progresses and conduct it to the cylinder and stationary knife that it may be severed thereby. The said deflectors travel rearwardly and downwardly, the lower rearmost point of the path through which they travel being located just in front of the stationary knife and cutting-cylinder and approximately at the same height. As the grass to be severed must pass between the knife and cylinder, it is seen that the ends thereof are deflected to pass between the revolving knives of the cutting-cylinder and the stationary knife. Said deflectors consist of a plurality of transverse bars M, carried by endless chains N, supported by pulleys P and Q. The pulleys Q are mounted upon a shaft at the lower rear end of the frame, just in advance of the knife-cylinder R, and the pulleys P are mounted upon the forward elevated and overhanging portion S of said side pieces. The forward ends of said side pieces are supported by wheels T, carried by stems U. The shaft V, upon which the pulleys P are mounted, is supported in suitable bearings upon the side pieces and at one end is provided with a gear-wheel, conveniently a sprocket-pinion W, by which it is driven by means of the sprocket-chain X, trained around the same and the sprocket-wheel C of the roller E and over the guide-pulley F. The pulleys P and Q also have sprocket-teeth, and the belts N conveniently consist of sprocket-chains. The pulleys P are larger than the pulleys Q, and the gearing between the roller E and said shaft V is such that the deflecting-bars M travel to the rear faster than the machine progresses, so that they engage and bend the grass to the rear. The cross-bar J is at least as high as the shaft V, so that it is possible to cut grass that is as high as said shaft.

The transverse deflecting-bars M are preferably connected together about midway between their ends by one of said chains N, that serves to prevent them from bowing or bending outwardly by reason of centrifugal force when they are traveling at a high rate of speed.

The operation is as follows: When the machine advances, the lower runs of the belts or chains N travel to the rear at a greater speed than said machine advances, so that the high grass is engaged by the bars M and not only bent to the rear, but gradually depressed, owing to the downward inclination of the lower runs of said belts N, and consequently the path through which the bars M travel. This bends the high grass over and delivers it just in front of the stationary knife and the knife-cylinder, so that the grass passes between the same and is readily cut in an obvious manner.

Having thus described my invention, what I claim as new, and desire to secure by Letters Patent, is—

1. The combination with a lawn-mower having cutting devices consisting of a stationary knife and a rotatable cutting-cylinder situated above and in front of said stationary knife, of downwardly and rearwardly traveling deflectors mounted in advance of said cutting devices, the lower rearmost point of the path of said deflectors being situated in front of and approximately at the same height as said stationary knife and the lower side of the rotatable cutting-cylinder, whereby the grass is deflected below the lower side of the cutting-cylinder and between the same and said stationary knife.

2. The combination with a lawn-mower having cutting devices consisting of a stationary knife and a rotatable cutting-cylinder situated above and in front of said stationary knife, of an attachment secured to the front end of said lawn-mower and having a raised forward portion, supporting-wheels at the front end of said raised forward portion, guide-pulleys mounted upon the lower end of said attachment in front of and approximately at the same height as the stationary knife and the lower side of the rotatable cutting-cylinder, guide-pulleys mounted upon the raised forward portion of said attachment, belts trained around said pulleys and provided with transverse deflector-bars, and means for causing said belts to travel.

WILLIAM H. H. HEYDRICK.

Witnesses:
JOHN A. WIEDERSHEIM,
WM. CANER WIEDERSHEIM.